Patented Nov. 15, 1927.

1,649,496

UNITED STATES PATENT OFFICE.

NORBERT SPECHT, OF BERLIN-ORANIENBURG, GERMANY.

PROCESS FOR THE MANUFACTURE OF TITANIC OXIDE.

No Drawing. Application filed May 19, 1925, Serial No. 31,324, and in Germany May 24, 1924.

The invention relates to an improved process for the manufacture of pure white, and well covering titanic oxide substantially free from iron. Titanic oxide answering all requirements for instance as a paint, must not contain perceptible quantities of iron and simultaneously it must possess the property of a well covering paint. A process is known for obtaining a well covering paint of titanic dioxide, which is characterized in that the strongly acid solutions of sulphate of titanium are subjected to hydrolytic decomposition under pressure.

Exhaustive investigation has proved that with this process under predetermined working conditions an optimum is obtained as regards the absence of iron and the covering property. In addition it was found, that under these working conditions the optimum of the absence of iron and the optimum of the covering property will almost coincide. The decisive conditions for a success are the following: the contents of free acid in the solution, the absolute concentration of said solution and the temperature for hydrolysis. It has been found that the best results were obtained when hydrolysis is effected at temperatures ranging from 170 to 180 degrees centigrade, but at any rate not falling below 160 degrees centigrade, namely with the aid of a solution of sulphate of titanium, whose specific gravity is about 1.5 and whose sulphuric acid content is about 35 per cent by weight, the free sulphuric acid and that bound to the titanium being taken as a whole.

According to the temperatures maintained within the limits indicated the specific gravity and the contents of acid might be chosen the higher the lower the temperature of the solution to be hydrolyzed is kept. The admissible limits for the specific gravity and the acid contents for the range of temperatures mentioned, that is to say from 160 to 180 degrees centigrade, fluctuate for the former between 1.55 and 1.35 and for the latter between 40 and 25 or at the most 45 per cent of total acid contents.

The specific gravity being decisive for the successful result, can also be obtained by adding neutral soluble salts as for instance a sulphate, particularly the sulphate of an alkali metal, that is to say, of a metal whose oxide is white. If no importance is attached to the product being free from iron, a well covering titanic acid can be obtained in the event of the specific gravity being too low, by adding iron sulphate to such an extent, that the solution will have a specific gravity from about 1.4 to 1.5.

I claim:

1. In the manufacture of white well covering titanic oxide free from iron, the process of hydrolyzing at temperatures from 160 to 180 degrees centigrade by means of solutions having a specific gravity ranging from 1.35 to 1.55 and the total acid contents of said solutions ranging from 25 to 40 per cent.

2. In the manufacture of pure white well covering titanic oxide free from iron, the process of hydrolyzing at temperatures from 160 to 180 degrees centigrade by means of solutions having a specific gravity ranging from 1.35 to 1.55, the total acid contents of said solutions ranging from 25 to 40 per cent, and obtaining the desired specific gravity of from 1.35 to 1.55 by the addition of soluble sulfates of metals whose oxides are white.

3. In the manufacture of pure white well covering titanic oxide free from iron, the process of hydrolyzing at temperatures from 160 to 180 degrees centigrade by means of solutions having a specific gravity ranging from 1.35 to 1.55 the total acid contents of said solutions ranging from 25 to 40 per cent, and obtaining the desired specific gravity of from 1.35 to 1.55 by adding alkali metal sulphates.

4. In the manufacture of well covering titanic oxide, the process of hydrolyzing at temperatures from 160 to 180 degrees centigrade by means of solutions having a specific gravity ranging from 1.35 to 1.55.

In testimony whereof I affix my signature.

Dr. NORBERT SPECHT.